W. A. AUSTIN.
LINE GUIDE FOR FISHING REELS.
APPLICATION FILED DEC. 7, 1908.
938,948.
Patented Nov. 2, 1909.
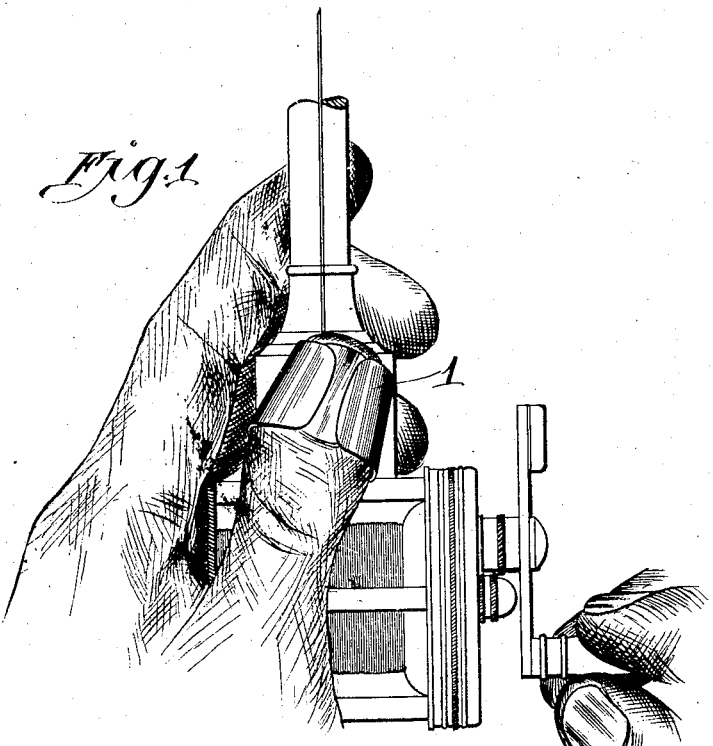
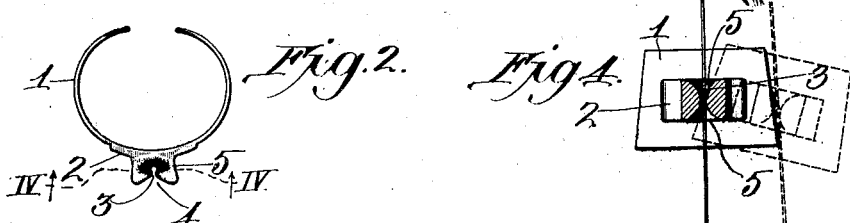
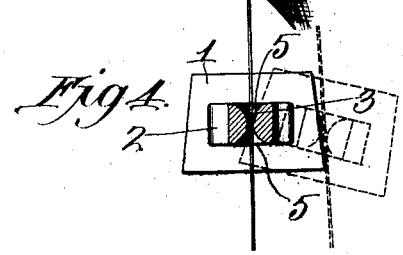
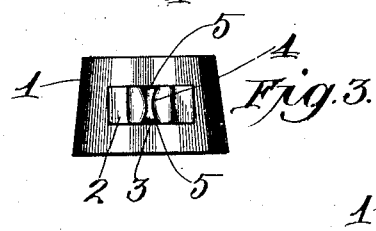
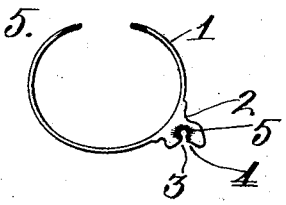
Witnesses
Frank R Glore
M. A. O'Donnell
Inventor:
Will A. Austin
By George H Thorpe Atty.

UNITED STATES PATENT OFFICE.

WILL A. AUSTIN, OF KANSAS CITY, MISSOURI.

LINE-GUIDE FOR FISHING-REELS.

938,948.  Specification of Letters Patent.  Patented Nov. 2, 1909.

Application filed December 7, 1908. Serial No. 466,696.

*To all whom it may concern:*

Be it known that I, WILL A. AUSTIN, a citizen of the United States, residing at Kansas City, in the county of Jackson and State of Missouri, have invented certain new and useful Improvements in Line-Guides for Fishing-Reels, of which the following is a specification.

This invention relates to what may be termed line-guides for fishing reels, my object being to produce a device of this character for use upon the thumb of the hand holding the rod, by which the person handling the rod can effect a uniform and even distribution of the line on the reel as the former is wound up, by simply moving his thumb from side to side, and from which the line can be instantly freed by simply drawing the thumb back away from the reel and as easily reëngaged by reversing the motion of the thumb. With a device of this character an even and uniform winding of the line can be effected without the thumb becoming cramped or tired, as is the case where the operator guides the line between his thumb and index finger, the method usually resorted to, and by which method the line frequently piles up in places and becomes entangled,—especially when a game fish has been hooked.

A further object is to produce a device of this character embodying a split thimble of resilient material so that it may fit thumbs of various sizes, and which is of simple, strong, durable and cheap construction.

With these objects in view the invention consists in certain novel and peculiar features of construction and organization hereinafter described and claimed, and in order that it may be fully understood, reference is to be had to the accompanying drawing, in which;

Figure 1, is a view of a fragment of a fishing rod equipped with a reel and line, and also discloses a hand supporting the rod, with the thumb in operative relation to the line and equipped with a line-guide embodying my invention. Fig. 2, is an enlarged end view of the line-guide. Fig. 3, is an inverted plan view of the line-guide. Fig. 4, is a section on line IV—IV of Fig. 2. Fig. 5, is an end view of a modified form of the line-guide. Fig. 6, is an enlarged end view of the line-guide equipped with an agate bearing; the thimble portion of the device extending at right-angles to the passage.

The line-guide consists of a preferably split thimble 1, formed of a strip or ribbon of spring metal. At the opposite side of the thimble from the ends of the strip or ribbon is a lug 2 provided with a line-guide passage 3 having a flaring lateral mouth 4 opening downward so that when the thumb is lowered the flaring mouth of the passage facilitates engagement with the line and insures the threading of the latter into the passage 3 without requiring the operator to exercise any special care in the operation, as the engagement of either wall of the flaring mouth with the line will result in the engagement of the latter with passage 3. By reversing the movement of the thumb the line-guide is instantly withdrawn from engagement with the line. It will thus be seen that the line is always under perfect control of the operator and that the line-guide is never in engagement with it except when the line is being reeled in, as the rod is usually held and manipulated by the other hand in making a cast. In the preferred construction the walls of the passage, particularly the side walls are bowed toward each other between their ends to produce flaring ends 5, for the passage and thus permit the line to extend therethrough in a substantially straight line irrespective of whether the passage is disposed parallel with or at an angle to the line as indicated by full and dotted lines in Fig. 4, it being obvious that such latter relation must exist when the thumb is at one extremity or the other of the horizontal sweep it is caused to make to effect a substantially uniform and even distribution of the line from one head or end of the reel to the other. By thus flaring each end of the passage the line is permitted to extend through it without any or but little deflection from a straight course to the reel, and is not subjected to any undesirable friction or abrasion tending to weaken or break it, it being of course understood that the walls of the passage must be perfectly smooth; the walls being made almost frictionless if desired by equipping the passage with an agate or equivalent lining or bearing 6.

If desired the lug may be projected laterally from the thimble as shown by Fig. 5. It is also contemplated to provide a line-guide of this type in which the passage shall extend at an angle to the passage of the thimble and thus be susceptible of use on the index finger of the hand holding the rod, such finger being held over the rod and forward of the reel and alternately extended and contracted cross-wise of the line to effect an even and uniform winding thereof upon the reel.

From the above description it will be apparent that I have produced a line-guide for fishing reels, embodying the features of advantage enumerated as desirable and which is susceptible of change in minor particulars without departing from the principle of construction involved.

Having thus described the invention what I claim as new and desire to secure by Letters-Patent, is:

1. A line-guide for fishing-reels, comprising a thimble equipped externally with a lug provided with a smooth passage having a mouth at one side which extends for the full length of the passage and which is of outwardly flaring form to facilitate the entrance of the line laterally into the passage.

2. A line-guide for fishing reels, comprising a split thimble and a lug projecting from the outer side thereof and provided with a smooth passage having at one side and for its full length an outwardly-flaring mouth and also having its side walls bowed toward each other between their ends.

In testimony whereof I affix my signature, in the presence of two witnesses.

WILL A. AUSTIN.

Witnesses:
  CHAS. TIEDERMAN,
  G. Y. THORPE.